(12) United States Patent
Hanlon

(10) Patent No.: US 6,395,207 B2
(45) Date of Patent: *May 28, 2002

(54) MICROGRAIN ADHESIVE METHOD AND A JOINT PRODUCED BY IT

(75) Inventor: William P. Hanlon, Rochester, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,569

(22) Filed: May 24, 1999

(51) Int. Cl.⁷ .......................... B29C 65/52; B28B 21/60
(52) U.S. Cl. ...................... 264/122; 264/128; 264/261; 264/DIG. 6; 403/268
(58) Field of Search ............... 264/69, 112, 65, 264/128, 261, 122; 403/268

(56) References Cited

U.S. PATENT DOCUMENTS

| | | | | |
|---|---|---|---|---|
| 2,313,110 A | * | 3/1943 | Wertz | 264/112 |
| 3,383,446 A | * | 5/1968 | Brennecke | 264/122 |
| 3,608,010 A | * | 9/1971 | Stayner | 264/51 |
| 4,208,647 A | * | 6/1980 | McVey et al. | 337/404 |
| 4,265,689 A | | 5/1981 | Jeffrey | 156/276 X |
| 4,407,770 A | * | 10/1983 | Ripoll | 264/69 |
| 4,729,809 A | | 3/1988 | Dery et al. | 156/276 X |
| 4,738,069 A | * | 4/1988 | Williams | 403/402 X |
| 4,836,967 A | * | 6/1989 | Frantl et al. | 264/69 |
| 4,923,665 A | * | 5/1990 | Andersen et al. | 264/62 |
| 4,950,525 A | | 8/1990 | Bailey | 156/276 X |
| 5,076,485 A | | 12/1991 | MacKay | 156/276 X |
| 5,135,590 A | * | 8/1992 | Basavanhally et al. | 156/64 |
| 5,235,741 A | * | 8/1993 | Mase | 29/830 |
| 5,368,792 A | * | 11/1994 | Short et al. | 264/36 |
| 5,470,416 A | * | 11/1995 | Herring, Jr. et al. | 156/196 |

FOREIGN PATENT DOCUMENTS

| | | | |
|---|---|---|---|
| GB | 863679 | * | 3/1961 |
| GB | 1042972 | * | 9/1966 |

OTHER PUBLICATIONS

Derwet, Two stage cementing, Apr. 13, 1966, Derwent Database, Abstract.*

* cited by examiner

Primary Examiner—Lynne H. Browne
Assistant Examiner—Ernesto Garcia
(74) Attorney, Agent, or Firm—Svetlana Z. Short

(57) ABSTRACT

A method of forming a joint comprises the steps of: (a) at least filling a container with granular particles, the granular particles having a size of 0.25 mm to 1 mm; (b) inserting a component part into the container; and (c) at least partially filling the container containing this component part and the granular particles with a flowable, curable liquid, this liquid having curing time of less than 90 seconds. According to one embodiment of the present invention, the curable liquid has a gap fill of less than 0.25 mm and the curing time is less than about 5 seconds or less.

20 Claims, 5 Drawing Sheets

US 6,395,207 B2

MICROGRAIN ADHESIVE METHOD AND A JOINT PRODUCED BY IT

FIELD OF THE INVENTION

This invention relates to a joint and method for producing a joint between two components and more particularly to a joint and method that uses micrograins and a fast curing adhesive to provide a fast alignment and joining of two components in precise relationship with one another.

BACKGROUND OF THE INVENTION

It is known that stable joints can be formed by cementing two or more components in place. However, because the typical curing time for most cements is relatively long (i.e., 5 minutes to several hours or several days), the expensive fixturing equipment holding these components in precise alignment is tied up for a long time, making the equipment unavailable for producing more jointed parts and increasing queue time and assembly. Furthermore, during the long curing time the two component may be inadvertently moved out of alignment and then set in place in that position.

Some methods of joining two or more components utilize a mixture of solid particles and a curable cementing compound to form such joints. For example, U.S. Pat. No. 4,836,967 describes a method for connecting a plurality of bars in a metal casting. This method includes the steps of pouring a granulated solid with grain size of 5 mm to 100 mm to into a metal casing having a centrally located aperture and a plurality of filling apertures, prestressing the solid by driving a mandrill through the filling apertures and injecting a hardening fluid such as a cement based grounding mortar through the central aperture. According to the summary of invention, prestressing the granulated solid results in a very stable joint. However, this step requires extra time during the joint assembly. Furthermore, making a casting with a special central aperture for accepting the hardening fluid and having to cover the central aperture after the hardening fluid is injected into the casing results in an expensive joint. Finally, this patent does not disclose how to achieve a precise alignment of the components relative to one another.

U.S. Pat. No. 4,407,770 describes a method for anchoring cables inside a sleeve. This method includes the steps of partially filling the sleeve containing the cables with the curable liquid made of epoxy resin and mineral powder, adding the aggregate particles and then, allowing the liquid mixture to cure to a solid mass. However, the epoxy resin/powder mixture takes relatively long time to cure.

SUMMARY OF THE INVENTION

It is an object of the present invention to provide a method for accurately positioning two component with respect to one another and then rapidly joining them together while preserving this alignment, forming a solid joint.

It is another object of the present invention to provide a stable joint comprised of two precisely aligned components. According to one aspect of the present invention, a method of forming a joint comprises the steps of: (a) at least filling a container with granular particles, the granular particles having a size of 0.25 mm to 1 mm; (b) inserting a component part into the container; (c) at least partially filling the container containing this component part and the granular particles with a flowable, curable liquid, this liquid having curing time of less than 90 seconds. According to one embodiment of the present invention, the curable liquid has a gap fill of less than 0.25 mm.

According to another aspect of the present invention, a method of forming a joint by connecting at least one component part to a housing having a fill cavity, comprising the steps of: (i) introducing granular solid material having a grain size from 0.25 mm to 1 mm into the fill cavity; (ii) placing at least a portion of the component part into the fill cavity; (iii) applying a hardening fluid into the fill cavity over the granular solid material, wherein the hardening fluid has a gap fill of less than 0.25 mm.

According to one embodiment of the invention, a method of forming a joint by connecting at least one component part to a housing having a fill cavity comprises the steps of: (i) introducing granular solid material having a grain size from 0.25 mm to 1 mm into said fill cavity; (ii) placing at least a portion of the component part into the fill cavity; (iii) aligning the component part with respect to the housing by moving the component part inside the cavity until a desired orientation is achieved; and (iii) applying a hardening fluid into the fill cavity, wherein the hardening fluid has a gap fill of less than 0.25 mm, to lock said component in said desired orientation.

According to yet another aspect of the present invention, a rigid joint comprises a plurality of components including: (i) a first component having an inner wall defining a fill cavity; (ii) a second component at least partially situated in the fill cavity of the first component; and (iii) a plurality of micrograms located between the inner wall and at least a part of the first component, the micrograms having a size of less than 1 mm. At least a portion of the micrograms is coated with a polymerizing liquid, such that the coated micrograms and the second component are fixably secured in place.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1:
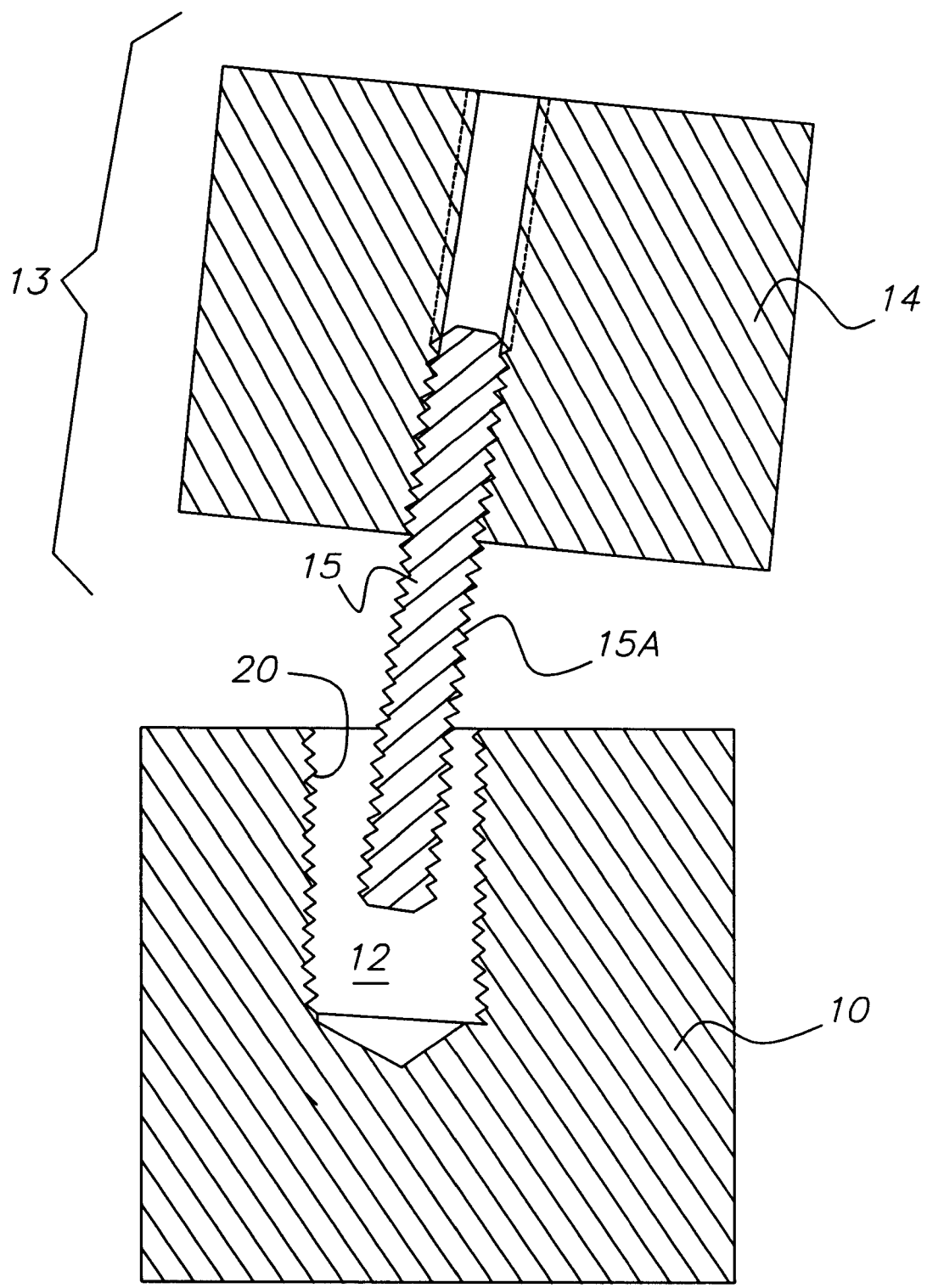
FIG. 1 is a cross-sectional view of a plurality of mechanical components positioned relative to one another.
Figure 2:
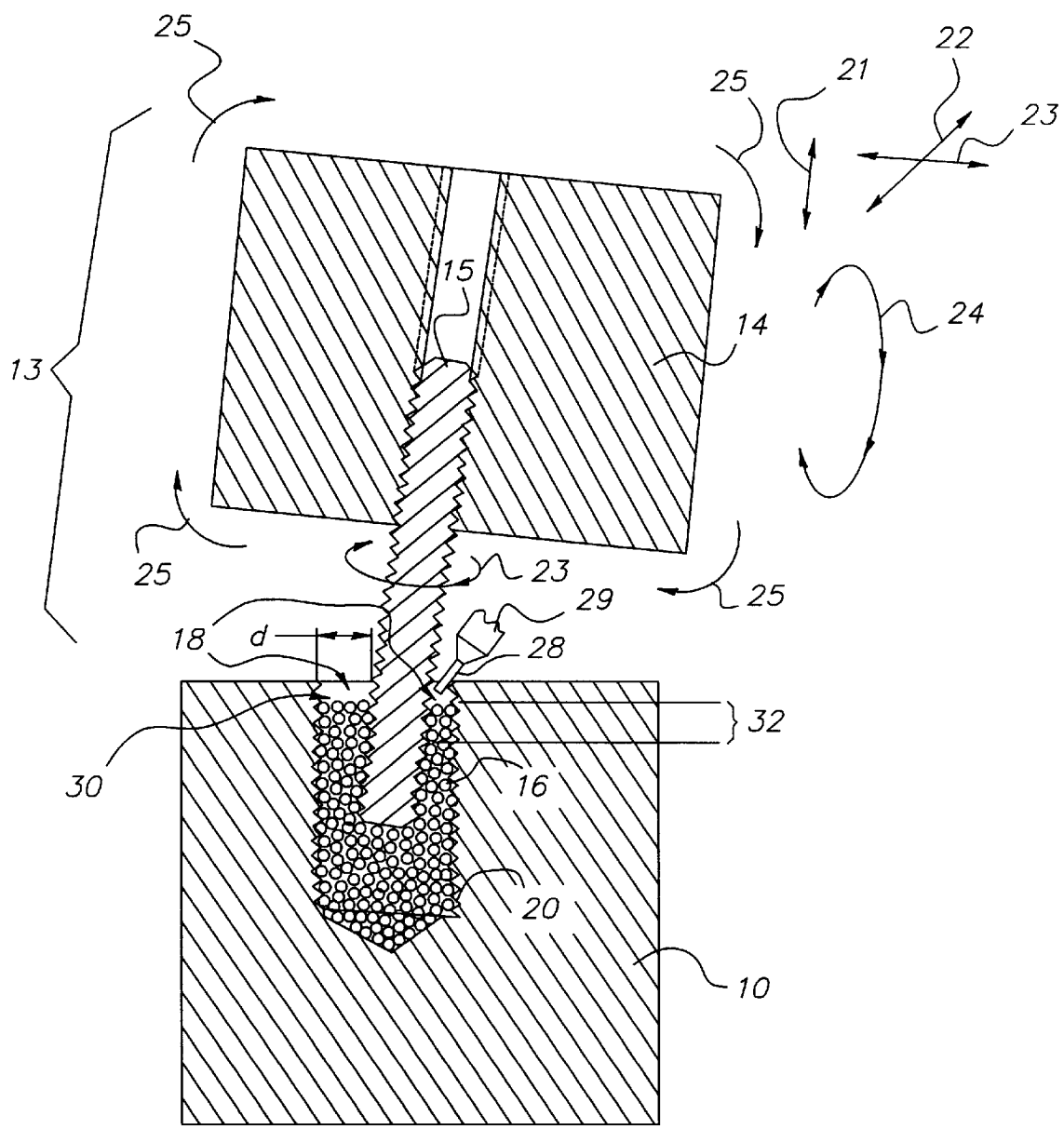
FIG. 2 is a cross-sectional view of the plurality of mechanical components of FIG. 1 after they have been joined to each other.
Figure 3:
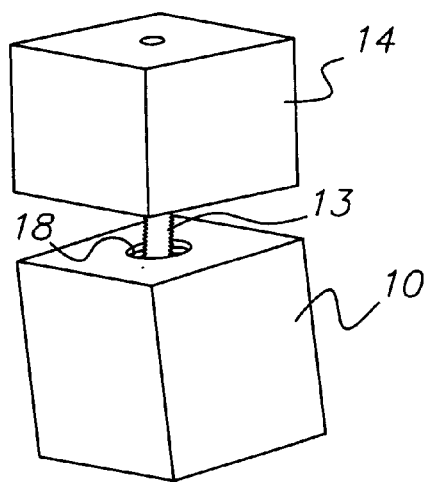
FIG. 3 is a perspective view the plurality of mechanical components of FIG. 1 after they have been joined to each other.

Referring to FIGS. 1, 2 and 3, a joint according to the first embodiment of the present invention comprises a first component 10 with a fill cavity 12 and a second component 13 at least partially situated in this fill cavity 12. More specifically, according to the first embodiment of the invention, the second component 13 comprises a block 14 and a post 15. The post 15 fits into the fill cavity 12 of the first component 10 and preferably has a textured outer surface 15A. The fill cavity 12 may have any cross section suitable for receiving the required part (such as the post 15, for example) of the second component 13. The fill cavity 12 should be larger than the portion of the second component 13 that is being inserted into the fill cavity 12. The walls 20 of the fill cavity are also preferably textured.

A plurality of micrograms 16 are poured into the fill cavity 12 and fill the void 18 between the wall 20 of the cavity 12 and the inserted part (i.e., the post 15) of the second component 13. The term "microgram" describes a solid particle that is not larger than 1 mm in its largest dimension. The width d of the void 18 needs to be a minimum of 3 micrograms. It is preferred that the width d be between 1 mm and 15 mm. In this embodiment, the void 18 has a width d of 2.5 mm to 3 mm (FIG. 2.) and the microgram size is about 0.3 mm.

Alternatively, the micrograms 16 are poured into the fill cavity 12 first and then the second component 13, or a part thereof, is pressed into the micrograins 16, displacing the micrograins 16. Either way, the micrograins 16 surround the part of the second component 13 that is situated inside the fill cavity. The micrograins 16 can be glass microspheres, metal microspheres, non spherical metal chips, table salt, sand or the like.

The second component 13, while its post 15 is surrounded by the micrograins 16, is not yet locked in place and can be moved relatively to the first component in six degrees of freedom indicated by arrows 21, 22, 23, 24, 25, 26 (for example, up, down, sideways, and tilted around). Once the proper orientation of the second component 13 is achieved, a fast curing adhesive liquid 28 is applied from a container 29 to the upper surface 30 of the micrograins 16. It is preferred that the liquid 28 is poured rather than dripped onto the top of micrograins 16. This provides better (i.e., deeper) penetration through the micrograins 16 filling the inside of at least a portion of the fill cavity 12. The liquid 28, for example Super Glue, penetrates through at least the top portion 32 (about 1 mm to 10 mm deep and, preferably, 3 mm to 6 mm deep) of the micrograins 16, coats the micrograins 16, fills the gaps between the micrograins, quickly hardens and locks the second component 13 in position. The curing time of the liquid 28 is less than 90 seconds and preferably less than 75 seconds and more preferably, no more than 30 seconds. It is most preferable that the curing time be no more than 20 seconds. In this specification the term "curing time" is defined as the time required for the liquid 28 to harden so that two components are prevented from further movement relative to one another, without the breakage of the joint.

As stated above, it is preferred that the wall 20 defining the fill cavity 12 and the outer surface 15A of the component 13 that fits inside the fill cavity 12 be textured; for example threaded, or sand blasted. This would provide a better gripping surface for the adhesive to bind with. The micrograins 16 have a size of 1 mm or less and preferably less than 0.5 mm. It is most preferable that the size of the micrograins 16 be between 0.25 mm and 0.5 mm. The small grain size (0.25 mm and 0.5 mm) produces more surface area and thus more bonding area, resulting in higher strength joint. Furthermore, smaller micrograins result in smaller gap areas between the micrograins. This, in turn, results in faster cure times. The fast curing adhesive liquids used with smaller size micrograins 16 should be less viscous in order to fill the smaller sized gaps between the micrograins 16. However, because all adhesive liquids have some viscosity, if the size of the micrograins is less than 0.25 mm the gap area between the micrograms becomes very small, making it hard for the liquid 28 to penetrate into the gaps. This results in weaker joints.

Preferable curing liquids are polymerizing liquids, for example, liquids that undergo anionic polymerization. An example of such liquid is cyanoacrylate adhesive such as a fast curing, single component cyanoacrylate instant adhesive available under the trade name of LOCTITE® PRISM™ 401 from Loctite Corp. of Newington, Conn. Typical curing or fixturing times for adhering to various materials for one of these fast curing liquids are provided below in Table 1. The data for other suitable materials is provided in Table 2. I have used LOCTITE® PRISM™ 401 and the Loctite product number 420 with glass microspheres of about 0.3 mm diameter and achieved a curing time, and thus a stable bond between two steel components 10 and 13, in about 5 seconds or less. Thus, two components can be secured in position quickly, maintaining the required alignment between the two components without disturbing their relative positions.

TABLE 1

Performance of LOCTITE ® PRISM ™ 401 on metallic and non-metallic substrates:

| Material | Typical Fixturing Time (seconds) |
|---|---|
| G-10 epoxy glass: | 10 |
| Steel (degreased): | 13 |
| Aluminum (etched): | 6 |
| Zinc dichromate: | 60 |
| Neoprene rubber: | 5 |
| Nitrile rubber: | 5 |
| ABS: | 6 |
| PVC: | 6 |
| Polycarbonate: | 23 |
| Phenolic materials: | 10 |

TABLE 2

| Loctite Product Number | 404 | 409 | 414 | 415 | 416 | 420 | 422 |
|---|---|---|---|---|---|---|---|
| Typical Use | Rubber "O" Ring Bonder | General Purpose Gel Adhesive | Plastic Bonder | Gap Filling Metal Bonder | Gap Filling Plastic Bonder | Wicking Type Plastic Bonder | Gap Filling Plastic Bonder |
| Color | Clear | Clear | Clear | Clear | Clear | Clear | Clear |
| Gap Fill | .005" | .010" | .006" | .008" | .008" | .002" | .008" |
| Resin Base | Ethyl | Ethyl | Ethyl | Methyl | Ethyl | Ethyl | Ethyl |

TABLE 2-continued

| Loctite Product Number | 404 | 409 | 414 | 415 | 416 | 420 | 422 |
|---|---|---|---|---|---|---|---|
| Viscosity cP | 80 | Gel | 110 | 1500 | 1500 | 2 | 2500 |
| Strength psi Tensile Shear | 3,500 | 3,200 | 3,200 | 3,600 | 3,200 | 2,900 | 3,200 |
| Temperature Range | −65° F. to 180° F. | −65° F. to 180° F. | −65° F. to 180° F. | −65° F. to 180° F. | −65° F. to 180° F. | −65° F. to 180° F. | −65° F. to 180° F. |
| Cure Speed* (Fixture) | 30 sec. | 75 sec. | 20 sec. | 30 sec. | 30 sec. | 20 sec. | 30 sec. |
| Full cure** | 24 hrs. | 24 hrs. | 24 hrs. | 24 hrs. | 24 hrs. | 24 hrs. | 24 hrs. |
| Specific Gravity | 1.09 | 1.10 | 1.05 | 1.09 | 1.05 | 1.05 | 1.09 |
| Technical Data Sheet | 404 | 409 | 414 | 415 | 416 | 420 | 422 |

*Cure speed depends on the materials to be jointed and, therefore, may be less than the cure speed indicated in Table 2.
**Full cure is the time required to achieve maximum joint strength.

Figure 4:
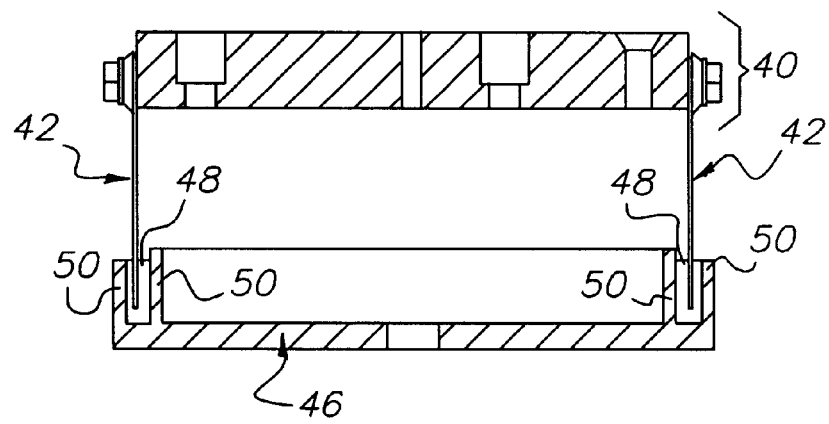
FIG. 4 is a cross sectional view of a frame and a frame base positioned relative to one another.
Figure 5:
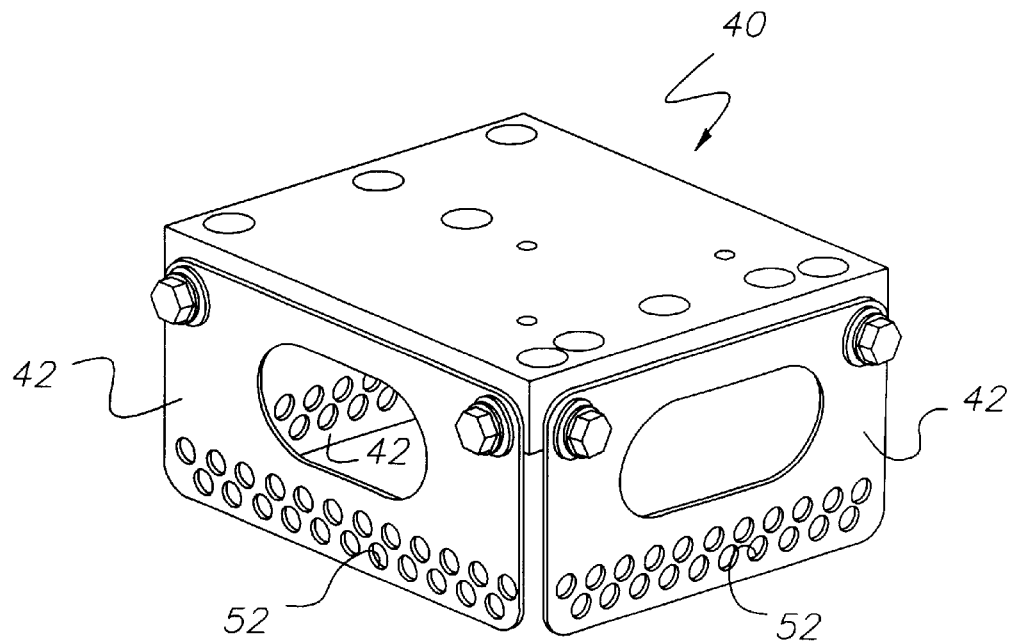
FIG. 5 is a perspective view of the frame of FIG. 4.
Figure 6:
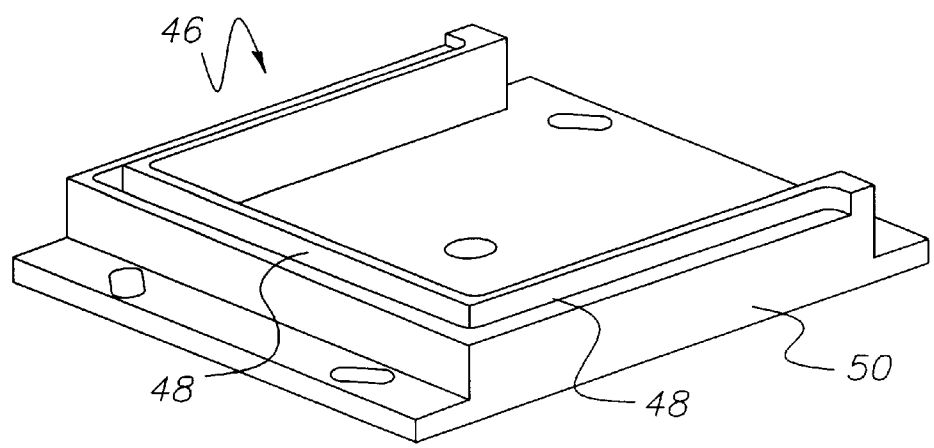
FIG. 6 is a perspective view of the frame base of FIG. 4.
Figure 7:
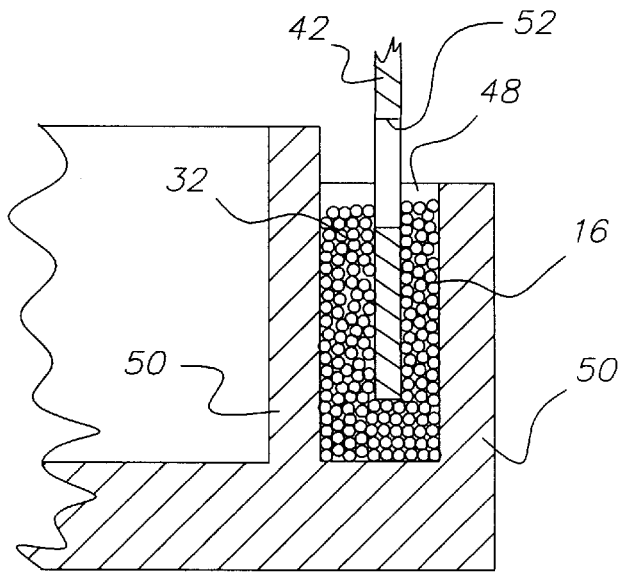
FIG. 7 is a cross sectional view of a portion of a frame base of FIG. 4 with a cavity containing micrograms and a side wall portion of the frame of FIG. 4.
Figure 8:
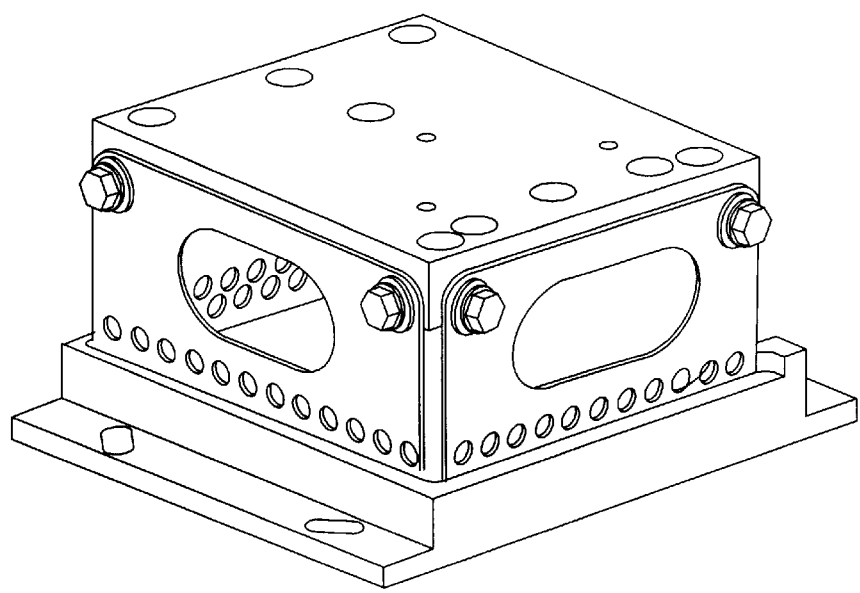
FIG. 8 is a perspective view of the frame and the frame base after they have been joined to each other.

FIG. 4 illustrates a second embodiment of the present invention. A frame 40 comprising three side walls 42 (FIG. 5) needs to be aligned with the frame base 46 and rigidly attached thereto. According to this embodiment of the present invention, the frame base 46 includes a long and narrow fill cavity 48 formed by the walls 50 (FIG. 6). This fill cavity 48 is filled with the micrograins 16. The side walls 42, having holes 52, of the frame 40 are pressed into the fill cavity 48 and the micrograins 16 are displaced to fill the void between the walls 42 and the walls 50 (FIG. 7). Alternatively, the side walls 42 are inserted into the fill cavity and the micrograins 16 are used to fill the void between the walls 50 and the walls 42. The frame 40 is moved (translated and rotated) until it has the correct orientation relative to the frame base 46. The frame 40 is held in this position by a holding fixture (not shown) and a fast curving liquid 28, for example, LOCTITE® PRISM™ 420, is then poured into the fill cavity 48 on both sides of walls 42. The fast curing liquid 28 seeps at least into the top layer 32 of the micrograins 16, undergoes polymerization, quickly hardens and rigidly secures the frame walls 42 inside the cavity 48 of the frame base 46. The hardening of the fast curing liquid 28 secures quickly the frame 40 in precise orientation with respect to the frame base 40 (FIG. 8). I have achieved a rigid connection between the frame and the frame base in about 5 seconds or less. This is much faster than 5 minutes to several days time required for hardening cementing components typical of the prior art.

It is an advantage of the method of the present invention that it provides an improved method for assembling components that require sizeable movements and precision when positioning and aligning by providing these components with unrestricted movement (six degrees of freedom). The improved process is non-destructive to the alignment because the fast curing fluid 28 does not displace the two components relative to one another. It is also an advantage of the improved method that the components are rapidly and fixably secured to one another without introducing distortion, creep, or other non-desirable changes in position of these components.

Existing technologies that could be replaced with the above described method of the present invention are, for example, complicated and time-consuming mechanical screw adjustments. Although such mechanical screw adjustments could accomplish precision alignments, the cost in parts and labor is very high. The improved method of the present invention can also be used instead of the prior art methods that require filling the void between two components (that have been aligned) with an adhesive that needs to be cured by the ultraviolet light or with long-time curing adhesive such as epoxy resin.

The invention has been described in detail with particular reference to certain preferred embodiments thereof, but it will be understood that variations and modifications can be effected within the spirit and scope of the invention.

PARTS LIST

10 First component
12 Fill cavity
13 Second component
14 Block
15 Post
15A Outer surface
16 Micrograins
20 Inner wall
21, 22, 23, 24, 25 26 Directional arrows
28 Liquid
29 Liquid container
30 Upper surface
32 Top portion
40 Frame
42 Frame walls
46 Frame base
48 Fill cavity
50 Walls of the frame base
52 Holes

What is claimed is:

1. A method of accurately positioning two components with respect to each other, said method comprising:
   at least partially filling a groove of a first component with granular particles, said granular particles having a size not greater than 1 mm;
   inserting a first portion of a second component into said groove of said first component;
   moving a second portion of said second component relative to said first component about six degrees of freedom until said second component achieves a desired orientation relative to said first component, said second portion of said second component being located outside said first component; and
   at least partially filling said first component containing said portion of said second component and said granular particles with a flowable, curable liquid having a curing time of less than 90 seconds while said second component is in said desired orientation relative to said first component.

2. The method according to claim 1, wherein said first portion of said second component is inserted into said first component through said granular particles.

3. The method according to claim 1, wherein said granular particles are placed into said first component after said first portion of said second component has been inserted into said first component.

4. The method according to claim 2, further comprising the step of:

holding said second component to preserve said desired orientation while said liquid is curing.

5. The method according to claim 3, further comprising the step of:

holding said second component to preserve said desired orientation while said liquid is curing.

6. The method of forming a joint according to claim 1, wherein said liquid has a curing time of less than 45 seconds.

7. The method according to claim 1, wherein said liquid has a curing time of less than 30 seconds.

8. The method according to claim 1, wherein said liquid has a curing time of less than 20 seconds.

9. The method according to claim 7, wherein said liquid is a polymerizing liquid.

10. The method according to claim 4, wherein said liquid is cyanoacrylate.

11. The method according to claim 1, wherein said liquid is a polymerizing liquid.

12. The method according to claim 1, wherein said liquid undergoes anionic polymerization.

13. The method according to claim 1, wherein said liquid is cyanoacrylate.

14. The method according to claim 1, wherein said size of said granular particles is at least 0.25 mm.

15. A method of aligning and joining at least one component to a housing, said method comprising the steps of:

introducing granular solid material having a grain size from 0.25 mm to 1 mm into a groove in said housing;

placing a first portion of said at least one component into said groove of said housing;

aligning a second portion of said at least one component relative to said housing about six degrees of freedom until said at least one component achieves a desired orientation relative to said housing, said second portion of said at least one component being located outside said groove of said housing; and applying a curing fluid into said groove over said granular solid material while said at least one component is in said desired orientation relative to said housing, wherein said curing fluid has a gap fill of less than 0.25 mm.

16. The method according to claim 15, wherein said curing fluid is a polymerizing fluid.

17. The method according to claim 16, wherein said curing fluid is cyanoacrylate.

18. The method of aligning and joining according to claim 15, further including the step of curing said fluid for less than 75 seconds.

19. The method according to claim 1, wherein of said first component and said first portion of said second component have textured walls, said first portion of said second component being inserted into said first component.

20. The method according to claim 15, wherein at least one of said first portion of said component has holes.

* * * * *